United States Patent [19]

Lun

[11] Patent Number: 4,886,253
[45] Date of Patent: Dec. 12, 1989

[54] HYDRAULIC ENGINE MOUNT WITH INTEGRAL HYDRAULIC CHAMBERS AND DIAPHRAGM

[75] Inventor: Saiman Lun, Englewood, Ohio
[73] Assignee: General Motors Corporation, Detroit, Mich.
[21] Appl. No.: 228,420
[22] Filed: Aug. 5, 1988
[51] Int. Cl.$^4$ .............................................. F16F 9/10
[52] U.S. Cl. ................................ 267/140.1; 248/636; 267/219
[58] Field of Search ................. 267/140.1, 219, 35, 267/64.19, 140.1 A, 140.1 R, 140.1 C; 248/526, 636, 638, 659

[56] References Cited

U.S. PATENT DOCUMENTS

| | | | |
|---|---|---|---|
| 4,262,886 | 4/1981 | Le Salver et al. | 267/8 |
| 4,277,056 | 7/1981 | Ticks | 267/140.1 |
| 4,383,679 | 5/1983 | Kakimoto | 267/140.1 |
| 4,418,895 | 12/1983 | Bertin et al. | 267/140.1 |
| 4,458,888 | 7/1984 | Wolf et al. | 267/140.1 |
| 4,588,173 | 5/1986 | Gold et al. | 267/140.1 |

FOREIGN PATENT DOCUMENTS

| | | | |
|---|---|---|---|
| 2652501 | 5/1978 | Fed. Rep. of Germany | 267/140.1 |
| 0037348 | 2/1984 | Japan | 267/140.1 |

Primary Examiner—Robert J. Oberleitner
Assistant Examiner—Matthew L. Graham
Attorney, Agent, or Firm—Ronald L. Phillips

[57] ABSTRACT

A compact hydraulic mount is provided for mounting a vehicle engine, transmission or the like to a vehicle frame. The mount includes a substantially cylindrical elastomeric hollow body defining a primary or core hydraulic chamber. An approximately 270° portion of the cylindrical outer periphery of the hollow body is surrounded and supported by a retainer cylinder. The hollow body additionally includes an integral secondary hydraulic chamber molded within the elastomeric wall. A portion of the retainer is inwardly, radially offset and separates the primary chamber from the secondary or peripheral chamber. The outside wall of the elastomeric body at the secondary chamber forms a resilient diaphragm. An orifice track is provided within the body to allow damping fluid communication between the primary and secondary hydraulic chambers. This flow of damping fluid between the chambers provides the damping action of the mount. A domed wall of the body includes an annular section for flexing in response to vibration or similar external forces. Fluid is thus forced through the orifice track and into the secondary chamber. Due to the retainer, the elastomeric body is prevented from appreciably deforming radially outwardly. This assures maximum damping fluid flow between chambers as the body is compressed. The diaphragm forming a part of the secondary hydraulic chamber is free to expand radially. The damping characteristic of the mount is relatively soft.

3 Claims, 2 Drawing Sheets

HYDRAULIC ENGINE MOUNT WITH INTEGRAL HYDRAULIC CHAMBERS AND DIAPHRAGM

TECHNICAL FIELD

The present invention relates generally to hydraulic mounts for vibration damping and, more particularly, to a vehicle mounted hydraulic mount of a compact design containing integral hydraulic chambers and orifice track molded into a single elastomeric body.

BACKGROUND OF THE INVENTION

A wide variety of hydraulic engine mount assemblies are presently available to isolate vibrations from a vehicle engine, transmission or the like and the vehicle frame. A very popular mount in use today is the hydraulic mount disclosed in U.S. Pat. No. 4,588,173 to Gold et al.

The hydraulic mount assembly of this prior invention includes a reinforced hollow elastomeric body which is closed on one end by a resilient diaphragm so as to form a cavity. This cavity is partitioned by a rigid plate into two chambers which are in fluid communication through a large decoupling orifice and an orifice track, both within the partition plate.

During operation, small amplitude vibrations produce no damping due to the decoupling orifice. Larger amplitude vibrations are hydraulically dampened by the flow of fluid along the orifice track between the two chambers. This mount assembly is adopted primarily for engine mounting where a relatively high degree of stiffness is desired and space is generally not at a premium.

Another hydraulic mount of fairly recent origin is disclosed by U.S. Pat. No. 4,262,886 to LeSalver et al. assigned to Peugeot. This patent discloses an integral hydraulic engine mount including upper and lower base mounting plates. An elastomeric body is interposed between the two plates. The elastomeric body is hollow and contains at least three hydraulic chambers; a relatively large primary or core chamber and two smaller secondary or peripheral chambers. The outer wall sections of the two peripheral chambers are relatively thin, and thus flexible, to allow radially outward deflection. The base plates span substantially the full area of the core chamber. The operational stiffness of this mount is generally comparable to the engine mount of the Gold patent.

The three chambers in the Peugeot patent are in fluid communication with one another through orifice tracks located within the elastomeric body. The elastomeric annular wall of the body surrounding the core chamber is thick to resist radial deflection and provide the necessary compressive support. The resistance to radial deflection of the elastomeric walls is increased somewhat by the addition of reinforcing rings molded within the elastomer.

During operation of this type of integral mount, the vibrational forces encountered tend to compress the mount, and accordingly the primary chamber. Due to the compressive pressure, some of the fluid is forced along the two damping orifice tracks, while some of the force tends to directly deform the annular wall of the mount. The outside wall sections surrounding the secondary or peripheral chambers are thinner to allow limited outward expansion. However, because the core chamber has a cross sectional area only as large as the base plate(s), a large proportion of the flexing force is transmitted directly to the relatively thick annular wall. This action tends to provide an overly stiff damping characteristic to the mount. Also, the peripheral chambers are not rigidly separated from the primary chamber and therefore, some of the internal forces of the fluid in the core chamber act radially outwardly, thereby lessening the damping effect provided by the mount.

A need thus exists for a hydraulic mount providing full hydraulic damping and improved performance with a softer damping characteristic during operation. Such a mount would have simple integral construction providing a greater proportion of fluid damping and less direct mechanical flexing of the support walls. The improved fluid action provides enhanced operating characteristics that span throughout the entire range of vehicle operating conditions.

SUMMARY OF THE INVENTION

Accordingly, it is a primary object of the present invention to provide a compact hydraulic mount overcoming the limitations and disadvantages of the prior art with respect to being overly stiff.

Another object of the present invention is to provide a hydraulic mount having a one piece elastomeric body defining integral core and peripheral hydraulic chambers for hydraulic damping for a softer damping coefficient.

An additional object of the present invention is to provide a hydraulic mount having integral hydraulic chambers in damping fluid communication through an integral orifice track with a greater proportion of fluid damping for improved, full range mount performance.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a hydraulic mount is provided for damping and isolating vehicle engine/transmission vibrations or the like. The preferred embodiment of the hydraulic mount selected to illustrate the invention includes a first mounting member connected to a hollow elastomeric body. This hollow body includes a relatively stiff annular wall forming a relatively large primary or core chamber closed by a base. This primary chamber is filled with damping liquid, which may be a commercial engine antifreeze/coolant.

The elastomeric body is substantially cylindrical having a thickened side wall and a domed end wall forming the primary chamber. Within the annular wall is molded an expandable secondary or peripheral chamber. According to an important aspect of the present invention, an integral orifice track also molded in the annular wall provides damping fluid communication between the primary and secondary chambers. In the preferred embodiment, this orifice track takes the form of an open groove molded into the bottom of the elastomeric body. The open groove is simply closed by the base. Advantageously, this simplifies fabrication of the mount as well as providing a compact one piece, self contained hydraulic mount which is easily installed in the place of the mounts commonly used today.

A relatively rigid retainer cylinder, preferably fabricated of sheet metal, surrounds the outside perimeter of the elastomeric body. This retainer cylinder covers the full height of the side wall to strengthen the mount and provide compressive rigidity. An approximately 90° arcuate portion of the retainer is radially offset in the inward direction, serving to operatively separate the secondary or peripheral chamber from the primary or core chamber. Accordingly, the thin portion of the side wall surrounding the secondary chamber outside the retainer cylinder forms a diaphragm which is outwardly expansible and flexes under the force of pressurized damping fluid entering the chamber.

In operation of the mount, vibration forces within the design amplitudes and frequencies of the mount move the mounting member to produce a contraction of the flexible annular portion of the domed end wall, and accordingly the primary chamber. Due to the restraining effect of the retainer cylinder, the body is prevented from appreciably deforming outwardly. Therefore, upon contraction of the primary chamber, the damping liquid is forced through the orifice track and into the secondary chamber. This entering liquid causes stretching of the diaphragm, increasing the volume of the secondary chamber. Upon reversal of the force, resulting in expansion of the primary chamber, the stretched diaphragm contracts forcing liquid back into the primary chamber, completing the damping cycle. In this manner, the mount advantageously provides vibration isolation and noise suppression with a relatively soft characteristic.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Figure 1:
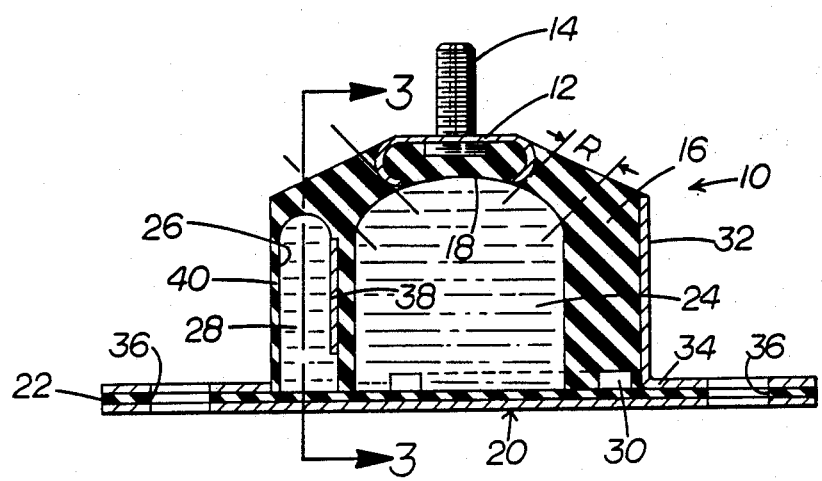
FIG. 1 is a cross-sectional view of the hydraulic mount of the present invention.

Reference will now be made in detail to the present preferred embodiment of the invention, an example of which is illustrated in the accompanying drawing.

DETAILED DESCRIPTION OF THE INVENTION

Reference is now made the the drawing figures showing the hydraulic mount of the present invention particularly adapted for mounting a component, such as an internal combustion engine or transmission to a frame member in a vehicle.

The hydraulic mount 10 includes a mounting member 12 as shown in FIG. 1. The mounting member 12 includes mounting stud 14. The mounting stud 14 projects outwardly from the hydraulic mount 10 for attachment to a vehicle engine, transmission or the like.

The mounting member 12 is a circular disc molded into the top of a hollow elastomeric body 16. As shown in FIG. 1, the mounting member 12 is attached to a domed end wall 18 and spans only about the center ½ of the wall. As will be explained in more detail below, this domed end wall 18 forms a flexible annular portion to move for damping engine vibrations.

The open end of the body 16 is closed by a base member 20. A layer of elastomer 22 cooperates with the elastomeric body 16 to seal the mount 10. This creates a primary chamber 24 for a damping liquid, which may be a commercial engine antifreeze/coolant. The diameter of the chamber is more than the diameter of the mounting member 12 to allow the top wall to flex as desired to provide the relatively soft damping action.

Figure 3:
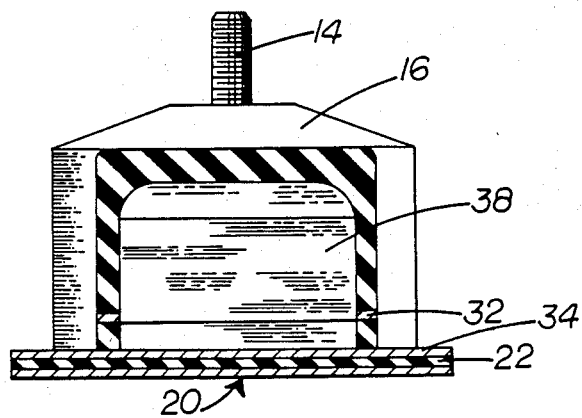
FIG. 3 is a sectional view taken along section line 3—3 of FIG. 1 showing the secondary or peripheral chamber contained within the wall of the body.
Figure 4:
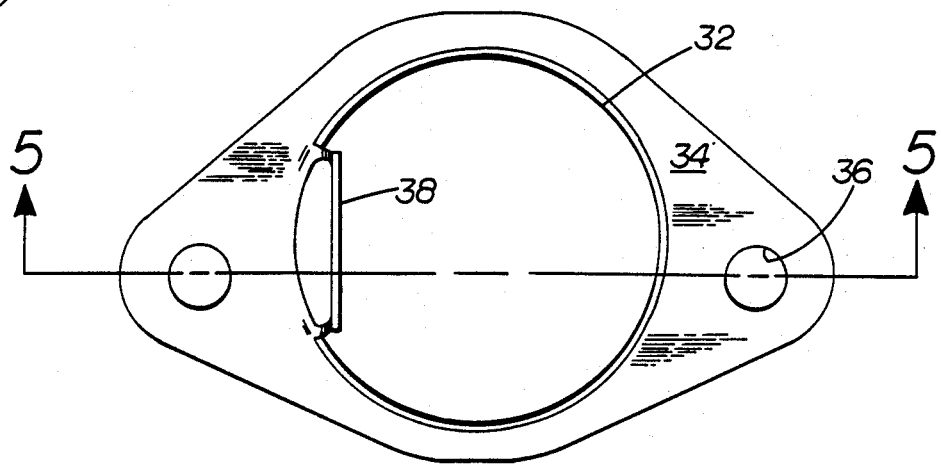
FIG. 4 is a top view of the retainer cylinder including flanged portion for mounting.
Figure 5:
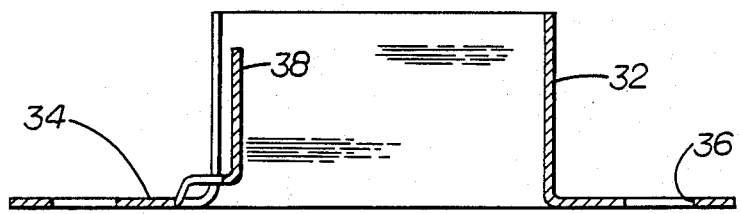
FIG. 5 is a cross sectional view of the cylinder taken along line 5—5 of FIG. 4.

As shown in FIGS. 1 and 3, the elastomeric body 16 is substantially cylindrical and has a relatively thick side wall around approximately 270°. Molded within the remaining 90° of side wall is a cavity 26 defining a secondary chamber 28. According to an important aspect of the present invention, an integral orifice track 30 provides damping fluid communication between the primary and secondary chambers 24, 28. In the preferred embodiment, the orifice track 30 is an open groove molded into the bottom of the elastomeric body 16. This open groove is simply closed by the base 20 when the mount is assembled. Advantageously, this simplifies fabrication of the mount as well as providing a one piece, compact self-contained hydraulic mount which is easily installed in the place of the mounts commonly used today. The orifice track 30 sizes and shapes can be modified to adapt the hydraulic mount 10 to a wide variety of vehicle component applications.

A retainer cylinder 32 fabricated of stiff sheet metal surrounds the 270° arc of the relatively thick side wall of the mount 10. The retainer cylinder 32 covers the full height of the side wall around this 270° span, terminating at its upper end at the domed top wall 18. The retainer 32 strengthens the mount 10 and provides rigidity. Because of the full height, the thickness and rigidity of the body 16 itself may be advantageously reduced from what would otherwise be required for the same support strength.

Figure 2:
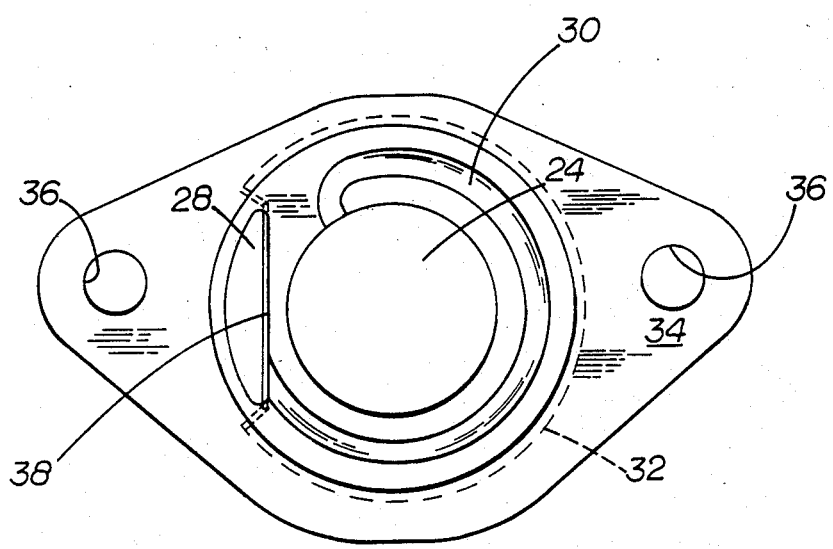
FIG. 2 is a bottom plan view of the elastomeric body and retainer cylinder of the hydraulic mount of the present invention, the base plate being removed for clarity.

As shown in FIGS. 1 and 2, the retainer cylinder 32 includes a flanged support portion 34 corresponding to the base 20. Two mounting holes 36 are provided extending through the support portion 34 and the base 20 for securing the assembly and mounting the hydraulic mount 10 to a vehicle frame or the like (not shown). As is known in the art, tabs or other fasteners (not shown) may be provided on the flanged portion 34 and secured to the body 16 over the base 20 to retain and seal the whole mount assembly.

The remaining 90° portion 38 of the retainer cylinder 32 is radially, inwardly offset, serving to operatively separate the secondary or peripheral chamber 28 from the primary or core chamber 24. Accordingly, the thin outside portion of the side wall surrounding the secondary chamber 28 (not surrounded by the full height retainer cylinder 32) forms a diaphragm 40 and this feature allows outward expansion and contraction for damping.

The domed end wall 18 includes an annular section R that is free to flex as the mount 10 receives vibrations. As best shown in FIG. 1, the annular portion is provided because the mounting member 12 does not span the full width of the primary chamber 24. Because this ring-shaped area is relatively free to flex, the mount 10 exhibits softer damping action characteristics as is desired. Preferably, the width of annular section R (see FIG. 1) is about one-half the diameter of the mounting member 12 so that relatively free flexing of the domed end wall can take place under vibration loading.

In operation of the mount, vibration forces within the design amplitudes and frequencies of the mount 10 produce an inward deflection of the flexible annular section R of the domed end wall 18. Due to the restraining effect of the retainer cylinder 32, the side wall of the body 16 is prevented from appreciably deforming outwardly. This results in contraction of the primary chamber 24 along the wall 18 and a relatively soft damping characteristic. Upon contraction of the primary chamber 24, damping liquid is forced through the orifice track 30 and into the secondary chamber 28. This entering liquid causes the outward stretching of the diaphragm 40, thereby increasing the volume of the secondary chamber 28. Advantageously, the offset portion 38 of the retainer cylinder 32 prevents the secondary chamber 28 from expanding inwardly towards the primary chamber 24. This assures full damping action of the fluid through the orifice track 30.

Upon reversal of the force, resulting in expansion of the primary chamber 24, the stretched diaphragm 40 contracts forcing liquid back into the primary chamber 24 through the orifice track 30, completing the damping cycle. In this manner, the mount advantageously provides vibration isolation and noise suppression with the utmost efficiency.

In summary, numerous benefits result from employing the concepts of the present invention. The hydraulic mount 10 incorporates integral primary and secondary hydraulic chambers 24, 28 in fluid communication with one another through an integral orifice track 30. The retainer 32 surrounds the outside wall of the body 16 with the exclusion of the diaphragm 40. This prevents the side wall of the body 16 from flexing due to compressive vibrational loads allowing full damping by the hydraulic mount 10. The hydraulic mount 10 is self-contained and is therefore readily implemented onto vehicles in place of the conventional engine mounts.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A hydraulic mount assembly, comprising:
   a mounting member;
   a resilient hollow body having an integral annular wall section connected to said mounting member;
   a relatively rigid retainer cylinder surrounding substantially the entire periphery of said hollow body;
   base means cooperating with said hollow body to form a closed primary chamber filled with fluid;
   said mounting member occupying an area of said hollow body centrally of said annular wall section that is substantially smaller in size than a corresponding cross sectional area of said primary chamber so that said annular wall section is free to flex;
   a secondary chamber integral with said hollow body and adjacent said primary chamber, said secondary chamber being separated from said primary chamber by a portion of said retainer cylinder;
   diaphragm means formed by an outer wall of said secondary chamber; and
   fluid communication means providing damping fluid flow between said primary and secondary chambers, whereby relatively soft damping action is effected upon movement of said mounting member.

2. A hydraulic mount assembly, comprising:
   a circular shaped mounting member;
   a resilient hollow body having a flexible annular section around and extending radially outward from said mounting member;
   a relatively rigid retainer cylinder for said hollow body;
   base means cooperating with said hollow body and said retainer cylinder to form a closed primary chamber of circular cross section filled with fluid;
   said cross section of said primary chamber having a diameter substantially larger than that of said mounting member so that said annular section is free to flex;
   a secondary chamber integral with said hollow body and adjacent said primary chamber, said secondary chamber being separated from said primary chamber by a portion of said retainer cylinder;
   diaphragm means formed by an outer wall of said secondary chamber; and
   an orifice track providing damping fluid flow between said primary and secondary chambers, whereby relatively soft damping action is effected upon movement of said mounting member.

3. A hydraulic mount assembly, comprising:
   a circular shaped mounting member;
   a resilient hollow body connected to said mounting member, said body having a chamber of circular cross section with a closed domed end and an opposed open end;
   a flexible annular section around and extending radially outward from said mounting member;
   a relatively rigid retainer cylinder surrounding substantially the entire periphery of said hollow body;
   base means cooperating with said open end of said hollow body and said cylinder to form a closed primary chamber filled with fluid;
   said mounting member spanning only about a center one-half of said domed end and said annular section having a width about one-half the diameter of said mounting member so that said annular section is free to flex;

a secondary chamber integral with said hollow body and adjacent said primary chamber, said secondary chamber being separated from said primary chamber by a portion of said retainer cylinder extending along an arc;

diaphragm means formed by an outer wall of said secondary chamber; and an orifice track providing restricted damping fluid flow between said chambers, said track means being molded in the face of said body adjacent said open end, whereby relatively soft damping action is effected upon movement of said mounting member.

* * * * *